US008315379B2

(12) United States Patent  
Masuda et al.

(10) Patent No.: US 8,315,379 B2  
(45) Date of Patent: *Nov. 20, 2012

(54) SINGLE TRANSDUCER FULL DUPLEX TALKING CIRCUIT

(75) Inventors: Masahisa Masuda, Beaverton, OR (US); Gontaro Kitazumi, Tokyo (JP)

(73) Assignee: Matech, Inc., Lake Oswego, OR (US)

( * ) Notice: Subject to any disclaimer, the term of this patent is extended or adjusted under 35 U.S.C. 154(b) by 1191 days.

This patent is subject to a terminal disclaimer.

(21) Appl. No.: 12/054,320

(22) Filed: Mar. 24, 2008

(65) Prior Publication Data

US 2008/0170515 A1 Jul. 17, 2008

Related U.S. Application Data

(63) Continuation-in-part of application No. 10/595,757, filed on May 9, 2006, now Pat. No. 7,881,483, and a continuation-in-part of application No. 10/595,758, filed on May 9, 2006, now Pat. No. 7,826,805.

(51) Int. Cl.  
*H04M 9/08* (2006.01)

(52) U.S. Cl. .................................. 379/406.08; 381/163

(58) Field of Classification Search ............. 379/406.08; 381/163  
See application file for complete search history.

(56) References Cited

U.S. PATENT DOCUMENTS

| | | | |
|---|---|---|---|
| 1,224,331 A | 5/1917 | Smith | |
| 3,114,105 A | 12/1963 | Neumiller | |
| 3,370,236 A | 2/1968 | Walker | |
| 3,781,492 A | 12/1973 | Cragg et al. | |
| 3,829,624 A | 8/1974 | Goodin et al. | |
| 2,955,140 A | 5/1976 | Stephens et al. | |
| 4,002,860 A | 1/1977 | Terai et al. | |
| 4,052,562 A | 10/1977 | Andersen | |
| 4,065,646 A | 12/1977 | Schuh | |
| 4,082,919 A | 4/1978 | Day et al. | |
| 4,087,636 A | 5/1978 | Akiyama et al. | |
| 4,156,800 A | 5/1979 | Sear | |
| 4,280,018 A | 7/1981 | Lazarus et al. | |
| 4,403,120 A | 9/1983 | Yoshimi | |
| 4,470,127 A | 9/1984 | Thompson | |
| 4,516,200 A | 5/1985 | Thompson | |
| 4,519,029 A | 5/1985 | Thompson | |
| 4,598,396 A | 7/1986 | Upp et al. | |

(Continued)

FOREIGN PATENT DOCUMENTS

EP 1213847 A 6/2002

(Continued)

OTHER PUBLICATIONS

Sedra et al., "Microelectronic Circuits," Jul. 1990, second edition, p. 143.

(Continued)

*Primary Examiner* — Alexander Jamal  
(74) *Attorney, Agent, or Firm* — Stolowitz Ford Cowger LLP

(57) ABSTRACT

A full duplex talking audio circuit uses a single transducer $Z_T$ which, even when various characteristics including the strength of a transmission signal change from moment to moment, enables the adequate operation of an echo canceling function and sufficiently compensates for the deterioration of the frequency characteristics of the transmission signal due to the acoustic transfer characteristics of the human body.

20 Claims, 3 Drawing Sheets

U.S. PATENT DOCUMENTS

| | | |
|---|---|---|
| 4,629,829 A | 12/1986 | Puhl et al. |
| 4,635,285 A | 1/1987 | Coombes |
| 4,644,330 A | 2/1987 | Dowling |
| 4,668,842 A | 5/1987 | Yokoyama et al. |
| 4,691,313 A | 9/1987 | Iwata |
| 4,695,823 A | 9/1987 | Vernon |
| 4,696,045 A | 9/1987 | Rosenthal |
| 4,741,018 A | 4/1988 | Potratz et al. |
| 4,833,719 A | 5/1989 | Carme et al. |
| 4,837,829 A | 6/1989 | Lobb |
| 4,912,758 A | 3/1990 | Arbel |
| 4,941,123 A | 7/1990 | Thompson |
| 4,972,491 A | 11/1990 | Wilcox |
| 5,007,046 A | 4/1991 | Erving et al. |
| 5,099,519 A | 3/1992 | Guan |
| 5,115,471 A | 5/1992 | Liden |
| 5,118,309 A | 6/1992 | Ford |
| 5,168,522 A | 12/1992 | Simanis et al. |
| 5,172,410 A | 12/1992 | Chace |
| 5,202,918 A | 4/1993 | White |
| 5,235,637 A | 8/1993 | Kraz et al. |
| 5,265,264 A | 11/1993 | Dzung et al. |
| 5,287,406 A | 2/1994 | Kakuishi |
| 5,307,405 A | 4/1994 | Sih |
| 5,311,144 A | 5/1994 | Grasset |
| 5,333,205 A | 7/1994 | Bogut et al. |
| 5,335,286 A | 8/1994 | Carlson et al. |
| 5,379,450 A | 1/1995 | Hirasawa et al. |
| 5,393,989 A | 2/1995 | Gempe et al. |
| 5,410,595 A | 4/1995 | Park et al. |
| 5,420,930 A | 5/1995 | Shugart, III |
| 5,465,298 A | 11/1995 | Wilkison et al. |
| 5,471,666 A | 11/1995 | Sugiyama et al. |
| 5,479,474 A | 12/1995 | Schwartzman et al. |
| 5,586,193 A | 12/1996 | Ichise et al. |
| 5,617,450 A * | 4/1997 | Kakuishi et al. .............. 375/230 |
| 5,692,059 A | 11/1997 | Kruger |
| 5,708,970 A | 1/1998 | Newman et al. |
| 5,715,309 A | 2/1998 | Bartkowiak |
| D399,206 S | 10/1998 | Yasutomi et al. |
| 5,824,966 A | 10/1998 | Leight |
| D403,681 S | 1/1999 | Lam |
| D404,035 S | 1/1999 | Delazzer |
| 5,899,973 A | 5/1999 | Bandara et al. |
| 5,907,538 A | 5/1999 | White |
| D426,880 S | 6/2000 | Leight |
| 6,104,824 A | 8/2000 | Ito |
| 6,105,714 A | 8/2000 | Lindgren |
| 6,138,790 A | 10/2000 | Leight |
| 6,175,633 B1 | 1/2001 | Morrill et al. |
| D439,574 S | 3/2001 | Katayama |
| 6,233,345 B1 | 5/2001 | Urwyler |
| 6,278,786 B1 | 8/2001 | McIntosh |
| 6,311,052 B1 | 10/2001 | Lenz |
| 6,357,292 B1 | 3/2002 | Schultz et al. |
| 6,370,245 B1 | 4/2002 | White |
| D458,244 S | 6/2002 | Masuda |
| D458,245 S | 6/2002 | Masuda |
| 6,415,034 B1 * | 7/2002 | Hietanen ..................... 381/71.6 |
| 6,480,610 B1 | 11/2002 | Fang et al. |
| 6,760,434 B1 * | 7/2004 | Rezvani et al. .............. 379/402 |
| 6,795,549 B2 | 9/2004 | Ferianz et al. |
| 7,072,476 B2 | 7/2006 | White |
| 7,826,805 B2 | 11/2010 | Masuda |
| 7,881,483 B2 | 2/2011 | Masuda |
| 2002/0186858 A1 | 12/2002 | Masuda |
| 2003/0134600 A1 | 7/2003 | Picone et al. |
| 2003/0185403 A1 | 10/2003 | Sibbald |
| 2004/0072540 A1 | 4/2004 | Wilson et al. |
| 2004/0213427 A1 | 10/2004 | Yoon |
| 2007/0133442 A1 | 6/2007 | Masuda |

FOREIGN PATENT DOCUMENTS

| | | |
|---|---|---|
| EP | 0719018 B | 11/2002 |
| FR | 2755561 | 5/1998 |
| JP | 0032833 | 4/1981 |
| JP | 03-054990 | 8/1991 |
| JP | 07-058673 | 3/1995 |
| JP | 08-256196 | 1/1996 |
| JP | 09-288560 | 4/1997 |
| JP | 09-140000 | 5/1997 |
| JP | 11-275674 | 8/1999 |
| JP | 2001060895 | 8/1999 |
| JP | 11-069480 | 9/1999 |
| JP | 2000-175285 | 6/2000 |
| JP | 2001-060985 | 3/2001 |
| RU | 2109408 | 4/1998 |
| WO | WO/93/23942 | 11/1993 |
| WO | WO 97/27721 | 7/1997 |
| WO | WO 98/20820 | 5/1998 |
| WO | WO 98/36515 | 8/1998 |
| WO | WO 98/45937 | 10/1998 |
| WO | WO 02/07477 | 1/2002 |
| WO | WO/03/039191 | 8/2003 |
| WO | WO/2005/048572 | 5/2005 |

OTHER PUBLICATIONS

Frank Kasparec, St. Poelten, Austria, Bilateral Speaker Networks Form Switchless Intercom, Electronics, vol. 53 p. 131, Jul. 3, 1980.

Compandor IC (Noise Reduction System), TK 10651M, -L, -D, TokyoSemiconductor, Catalog No. Z-1480110E.

D5004 Cellular Telephone Echo Control Device, DSP Group, Inc. Jan. 1991, Rev. 2.0.

Telephone Coupling Transformer, Mouser Electronics, Feb. 16, 1995.

Audio Transformers Telephone Coupling, Magna Tek, 90 East Union Street, Goodland, IN 47948.

Engineering Bulletin, Magnekek Goodland, pp. 2-3.

Low Voltage Compander, Specification and Applications Information, Motorola Semiconductors, MC33110.

LA8632M Case Outline: MFP-24S(300mil) Plastic Package.

Anderson, Hagood; "Simultaneous Piezoelectric Sensing Actuation . . ."; J Sound VIB.; Jul. 28, 1994; Academic Press Ltd., London, Engl., vol. 174, No. 5; p. 617-639.

International Search Report for PCT/US97/22887; Date of mailing Jan. 4, 1999; ISA/US.

International Search Report for PCT/US01/22121; Date of mailing Nov. 11, 2002; ISA/EPO.

International Preliminary Examination Report for PCT/US01/22121; Date of completion of report Jun. 6, 2003.

International Search Report for PCT/US02/33799; Date of mailing Jan. 24, 2003; ISA/EPO.

International Search Report for PCT/US04/37409; Date of mailing Aug. 29, 2005; ISA/US.

International Preliminary Report on Patentability for PCT/US04/37409; Date of completion of report May 11, 2006; IPEA/US.

Written Opinion of the International Searching Authority for PCT/US04/37409; Date of mailing Aug. 29, 2005; ISA/US.

Stolowitz Ford Cowger Listing of Related Cases, Sep. 2, 2009.

International Search Report for PCT/US09/38126; Date of mailing Jul. 22, 2009; ISA/US.

Written Opinion of the International Searching Authority for PCT/US09/38126; Date of mailing Jul. 22, 2009; ISA/US.

EP Search Report and Annex to EP Search Report for EP 97951667; Mailed Mar. 17, 2003.

International Search Report for PCT/US04/37406; Mailing date Apr. 15, 2005.

International Preliminary Report Report on Patentability PCT/US04/37406; Date of Completion of Report Sep. 29, 2005.

Written Opinion for PCT/US04/37406; Mailing date Apr. 15, 2005.

EP Search Report for EP App. No. 04810623; Date of Completion Dec. 13, 2007.

International Preliminary Report on Patentability for PCT/US09/038126; Date of issuance of report Sep. 28, 2010.

Stolowitz Ford Cowger LLP; Listing of Related Cases; Jun. 19, 2012.

* cited by examiner

SINGLE TRANSDUCER FULL DUPLEX TALKING CIRCUIT

This application is a continuation in part application of U.S. patent application Ser. No. 10/595,757, filed May 9, 2006 and U.S. patent application Ser. No. 10/595,758, filed May 9, 2006 which is incorporated by reference in its entirety.

TECHNICAL FIELD

The present invention relates to a single-transducer full duplex talking circuit.

BACKGROUND

In recent years, progress has been made in the microminiaturization of full duplex talking devices such as wireless hands-free earphone microphones, for example, and effects such as feedback or echo tend to be more likely to occur due to the reduction of the physical distance between the speakers and microphones used in earphone microphones. In addition, since it is essential that an earphone be placed in close proximity to the ear, it has become necessary to increase microphone sensitivity due to the increased distance between the microphone and the mouth producing the sound. This results in a situation in which it is extremely difficult to hear due to the effects of external noise or wind noise caused by high winds. In order to solve these problems, devices such as ultra-miniature hands-free earphone microphones incorporating echo prevention circuits or noise reduction circuits have been developed.

However, in a full duplex talking device in which the earphone and microphone are independent, in particular, since the microphone which generates transmission signals is placed in open space with constantly changing ambient acoustic characteristics, there are limits to the extent that factors inhibiting this communication can be predicted and reduced on a practical level. Even if circuits or algorithms necessary for echo prevention or noise reduction circuits are used, the scope of practical use is restricted by the effects of substantial external noise or wind noise due to strong wind.

Therefore, single-transducer type talking devices, which eliminate the effects of external noise by integrating the microphone inside the earphone, have been developed. For example, a full duplex talking circuit includes, a digital signal processing circuit is combined with an analog bridge circuit containing a single transducer to realize an echo canceling function which removes reception signals mixed with the transmission signals of the single transducer across almost all voice frequency bands.

However, various characteristics, including the strength of a transmission signal, generally change from moment to moment, and the transmission signal that is input into the single transducer is an audio signal that has passed through various organs of the body, including the eardrum. Therefore, it is necessary to compensate for the fact that the frequency characteristics have dramatically diminished due to the acoustic transfer characteristics of the human body.

In an actual situation in which the ambient acoustic environment changes in this way, not only does the echo canceling function fail to operate adequately in a conventional full duplex talking circuit, but transmission signals are also sometimes difficult to hear.

Figure 1:
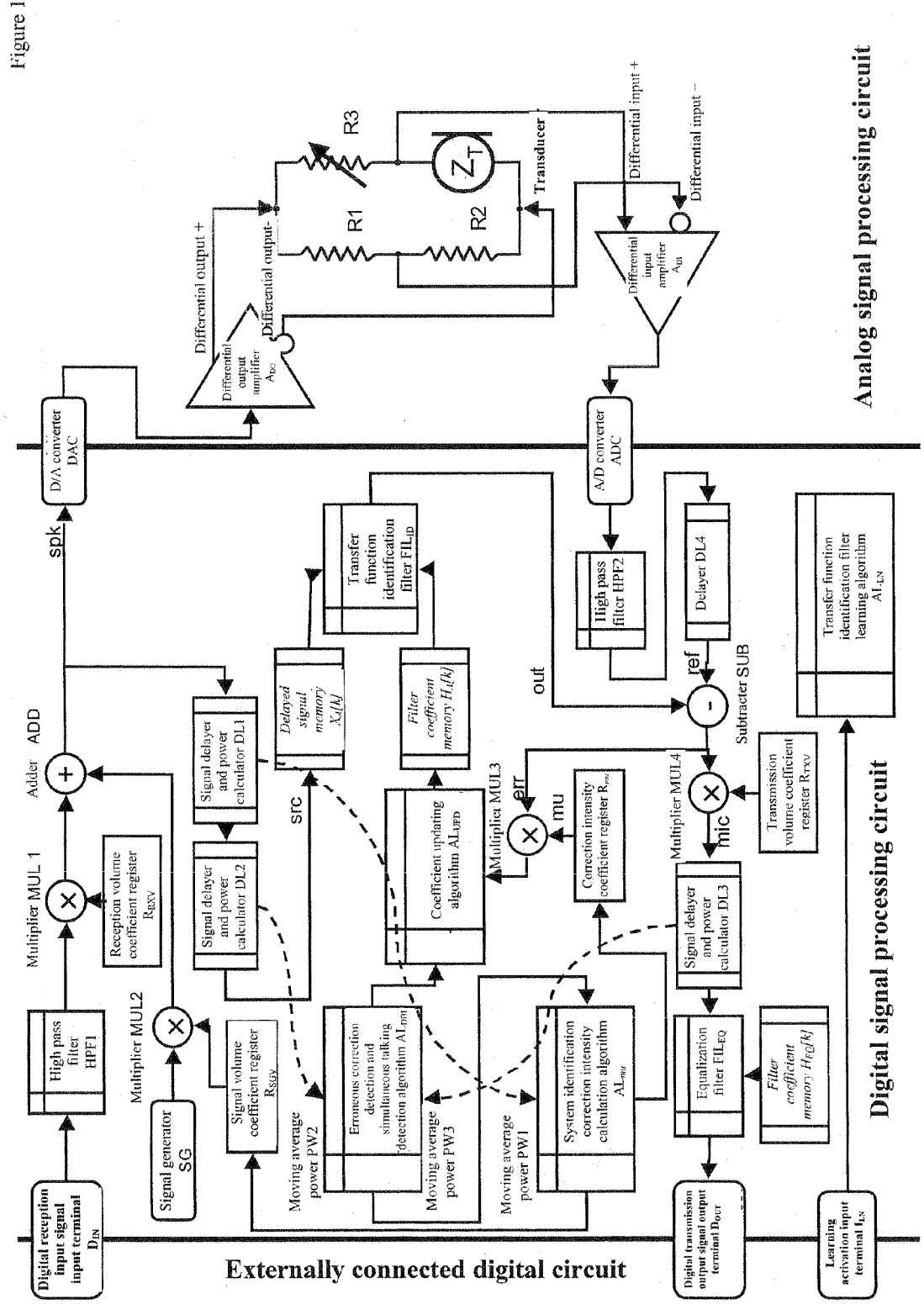
FIG. 1 is a block diagram showing an embodiment of a single-transducer full duplex talking circuit of the present invention.

The present application provides a single-transducer full duplex talking circuit combining an analog bridge circuit and a digital signal processing circuit using a single transducer having a receiving and transmitting function. The transducer is isolated from the external environment to a certain extent and can therefore block external noise and wind noise which obstruct talking since. As described above, it is possible to sufficiently compensate for the deterioration of the frequency characteristics of the transmission signal wherein the echo canceling function operates adequately even in cases where various characteristics including the strength of a transmission signal change from moment to moment and in cases in which the frequency characteristics of a transmission signal that is input into the single transducer are dramatically diminished due to the acoustic transfer characteristics of the human body.

DETAILED DESCRIPTION

A single-transducer full duplex talking circuit having a receiving and transmitting function, together with an analog signal processing circuit, a digital signal processing circuit, a coefficient updating algorithm, a system identification and learning correction intensity compensation algorithm, an erroneous correction detection and simultaneous talking detection algorithm, and an identification and learning algorithm which enable the full duplex talking circuit, is provided.

The analog signal processing circuit includes a bridge circuit containing $Z_T$ and the digital signal processing circuit cancels echo (leakage of reception signals into transmission signals through $Z_T$) with a transfer function identification filter which simulates transfer characteristics including those of the analog signal processing circuit. The digital signal processing circuit further includes the series of algorithms (a coefficient updating algorithm, a system identification correction intensity calculation algorithm, an erroneous calculation detection and simultaneous talking detection algorithm, and a transfer function identification filter learning algorithm) which determine the transfer function identification filter coefficient by repeated convergence.

| EXPLANATION OF REFERENCES | |
|---|---|
| $A_{DI}$ | (Analog) differential input amplifier |
| $A_{DO}$ | (Analog) differential output amplifier |
| $A_{CD}$ | A/D converter |
| $A_{DD}$ | Adder |
| $AL_{DBL}$ | Erroneous correction detection and simultaneous talking detection algorithm |
| $AL_{LN}$ | Transfer function identification filter learning algorithm |
| $AL_{mu}$ | System identification correction intensity calculation algorithm |
| $AL_{UPD}$ | Coefficient updating algorithm |
| DAC | D/A converter |
| $D_{IN}$ | Input terminal |
| DL1, DL2, and DL3 | First, second, and third signal delayers and power calculators |
| DL4 | Fourth signal delayer |
| $D_{OUT}$ | Output terminal |
| err | Error signal |
| $FIL_{EQ}$ | Equalization filter |

-continued

EXPLANATION OF REFERENCES

| | |
|---|---|
| $FIL_{ID}$ | Transfer function identification filter |
| $H_A[k]$ | first Filter coefficient memory (and first filter coefficient) |
| $H_{EQ}[k]$ | second Filter coefficient memory (and second filter coefficient) |
| HPF1 and HPF2 | First and second high pass filters |
| $I_{LN}$ | Learning activation input terminal |
| mu | Correction coefficient |
| MUL1, MUL2, MUL3, and MUL4 | First through fourth multipliers |
| PW1, PW2, and PW3 | First through third moving average power values |
| R1, R2, and R3 | First through third resistors (and their resistances) |
| $R_{RXV}$ | Reception volume coefficient register (and reception volume coefficient) |
| $R_{SGV}$ | Signal volume coefficient register (and signal volume coefficient) |
| $R_{TXV}$ | Transmission volume coefficient |
| SG | Signal generator |
| SUB | Subtracter |
| $X_A[k]$ | Delayed signal memory (and delayed signal) |
| $Z_T$ | Single transducer |

The single-transducer full duplex talking circuit includes connecting terminals for connecting to an external digital circuit, a digital signal processing circuit, a D/A converter DAC, an A/D converter ADC, and an analog signal processing circuit. The connecting terminals for an external digital circuit include an input terminal $D_{IN}$ into which a digital reception input signal is input, an output terminal $D_{OUT}$ into which a digital transmission output signal is output, and a learning activation input terminal $I_{LN}$.

Further, the analog signal processing circuit includes an analog differential output amplifier $A_{DO}$ which amplifies the output from the D/A converter DAC, a bridge circuit consisting of first, second, and third resistors R1, R2, and R3, and a single transducer which are driven by the output of the analog differential output amplifier $A_{DO}$. An analog differential input amplifier $A_{DI}$ amplifies an equilibrium signal output of the bridge circuit, wherein an analog output signal of the analog differential input amplifier $A_{DI}$ is supplied to the A/D converter (ADC).

In addition, the digital signal processing circuit is provided with a signal generator (SG), a second multiplier (MUL2) which multiplies the input from the signal generator SG by a signal volume coefficient register $R_{SGV}$. A first high pass filter HPF1 receives the digital reception input signal through the input terminal $D_{IN}$. A first multiplier (MUL1) multiplies the output of the high pass filter HPF1 by a reception volume coefficient $R_{RXV}$. An adder ADD adds the output of the first multiplier MUL1 and the output of the second multiplier MUL2. The output of the adder ADD is supplied to the D/A converter DAC which converts it into an analog signal. A first delayer and power calculator DL1 delays the output signal of the adder ADD and calculates the moving average power. A second signal delayer and power calculator DL2 delays the output of the first signal delayer and power calculator DL1 and calculates the moving average power. A delayed signal memory $X_A[k]$ sequentially stores the output of the second signal delayer and power calculator DL2. A transfer function identification filter $FIL_{ID}$ receives the output of the delayed signal memory $X_A[k]$ and a first filter coefficient memory $H_A[k]$ stores the filter coefficient $H_A[k]$ of the transfer function identification filter $FIL_{ID}$. A second high pass filter HPF2 receives the output of the A/D converter ADC and a fourth signal delayer DL4 receives the output of the second high pass filter HPF2. A subtracter (SUB) subtracts the output of the transfer function identification filter $FIL_{ID}$ from the output of the fourth signal delayer DL4 and a fourth multiplier MUL4 multiplies the output of the subtracter SUB by a transmission volume coefficient $R_{TXV}$. A third signal delayer and power calculator DL3 delays the output of the fourth multiplier MUL4 and calculates the moving average power. An equalization filter $FIL_{EQ}$ receives the output of the third signal delayer and power calculator DL3 and a second filter coefficient memory $H_{EQ}[k]$ stores the filter coefficient $H_{EQ}[k]$ of the equalization filter $FIL_{EQ}$. A transmission output terminal $D_{OUT}$ is driven by a digital transmission output signal output from the equalization filter $FIL_{EQ}$.

The first filter coefficient (also called $H_A[k]$ hereafter) corresponding to the transfer function identification filter $FIL_{ID}$ is stored in the first filter coefficient memory $H_A[k]$ and identifies the transfer function from the input end of the D/A converter DAC to the output end of the second high pass filter HPF2 via the analog signal processing circuit.

In the analog signal processing circuit, the bridge circuit is set to an equilibrium condition using the absolute value of the average impedance in the signal band of the reception signal (differential output signal of the analog differential output amplifier $A_{DO}$) which drives the transducer $Z_T$ when the transducer $Z_T$ is in operation. The third resistor R3 is configured with fixed resistance, variable resistance, or electronically variable resistance in order to satisfy the equilibrium condition. The digital reception input signal is divided by the resistance from the differential output of the differential output amplifier via the D/A converter DAC and is converted from an electrical signal to an acoustic signal by the transducer $Z_T$.

In the analog signal processing circuit, the voltage obtained by dividing the output of the differential output amplifier $A_{DO}$ with the first resistor R1 and the second resistor R2 is used as one input signal. The sum of the voltage obtained by dividing the output of the differential output amplifier with the third resistor R3 and the transducer $Z_T$ and the voltage converted to electromotive force from transmission acoustic vibration by the transducer $Z_T$ is used as another input signal. A differential signal of these signals is amplified by the differential input amplifier $A_{DI}$.

The digital signal processing circuit has a function in which the first filter coefficient $H_A[k]$ corresponding to the transfer function identification filter $FIL_{ID}$ is dynamically corrected in accordance with changes in the transfer function due to changes in acoustic impedance when the transducer $Z_T$ is in operation.

In the digital signal processing circuit, the second filter coefficient (also called $H_{EQ}[k]$ hereafter) corresponding to the equalization filter $FIL_{EQ}$ stored in the second filter coefficient memory $H_{EQ}[k]$ is a tap coefficient which corrects acoustic inconsistencies in electrical signals generated by the transducer $Z_T$ due to transmission acoustic vibration. The transmission signal is adjusted such that it has acoustic characteristics similar to the acoustic vibration generated from the actual sound source (in other words, the vicinity of the mouth of the person speaking).

The digital signal processing circuit also includes a correction intensity coefficient register $R_{mu}$ which holds a correction coefficient mu. A third multiplier MUL3 multiplies the correction coefficient mu by an error signal err, which is the output of the subtracter SUB. A coefficient updating algorithm $AL_{UPD}$ updates the first filter coefficient $H_A[k]$ corresponding to the transfer function identification filter $FIL_{ID}$ based on the output of the third multiplier. The coefficient updating algorithm $AL_{UPD}$ supplies the first filter coefficient $H_A[k]$ to the transfer function identification filter $FIL_{ID}$ and updates the first filter coefficient $H_A[k]$ as a result of the convergence of this repeated computation.

The digital signal processing circuit is further provided with a system identification correction intensity calculation algorithm $AL_{mu}$ which dynamically controls the convergence time and convergence error of the repeated computation of the filter coefficient $H_A[k]$ of the transfer function identification filter $FIL_{ID}$ using the first moving average power value PW1.

The digital signal processing circuit is further provided with an erroneous correction detection and simultaneous talking detection algorithm $AL_{DB}$ having a function which, when updating the first filter coefficient $H_A[k]$, assesses whether to dynamically update the coefficient by comparing the second moving average power value PW2 and the third moving average power value PW3 and detects erroneous correction.

The digital signal processing circuit is further provided with a transfer function identification filter learning algorithm $AL_{LN}$ having a function which, when the error signal err exceeds a certain constant value, is forcibly activated as it is considered to be in the erroneous correction state or is forcibly activated from the outside through the learning activation input terminal $I_{LN}$. The learning algorithm generates a standard signal using the signal generator SG, reactivates the coefficient updating algorithm $AL_{UPD}$, and recalculates the first filter coefficient $H_A[k]$ corresponding to the transfer function identification filter $FIL_{ID}$.

The single-transducer full duplex talking circuit includes a relatively small-scale analog signal processing circuit. The digital signal processing circuit is further provided with components such as a coefficient updating algorithm, a system identification correction intensity calculation algorithm, an erroneous correction detection and simultaneous talking detection algorithm, a transfer function identification filter learning algorithm, and an equalization filter. The echo canceling function sufficiently compensates for the deterioration of the frequency characteristics of the transmission signal, even in cases in which various characteristics including the strength of the transmission signal change from moment to moment and in cases in which the frequency characteristics are dramatically diminished due to the acoustic transfer characteristics of the human body. Moreover, recent advances in analog/digital technology enable the hardware that realizes all of this to be contained in an ear piece.

Optimal modes for carrying out the single-transducer full duplex talking circuit will be described in detail hereinafter with reference to the drawings.

Single-transducer Full Duplex Talking Circuit Configuration Example.

The analog signal processing circuit and the digital signal processing circuit of the present invention will be described with reference to FIG. 1. FIG. 1 is a block diagram showing an example of the analog signal processing circuit and the digital signal processing circuit. A receiving and transmitting circuit uses a single transducer having receiving and transmitting functions, which allows full duplex talking and has connecting terminals for connecting to an external digital circuit. The receiving and transmitting circuit includes an input terminal $D_{IN}$ for a digital reception input signal, an output terminal $D_{OUT}$ for a digital transmission output signal, a learning activation input terminal $I_{LN}$, a digital signal processing circuit, a D/A converter DAC, and an A/D converter ADC. An analog signal processing circuit includes a differential output amplifier $A_{DO}$, a differential input amplifier $A_{DI}$, and a bridge circuit consisting of three resistors R1, R2, and R3 and a transducer $Z_T$.

The digital signal processing circuit has a first high pass filter HPF1, a first multiplier MUL1, a reception volume coefficient register $R_{RXV}$, a signal generator SG, a second multiplier MUL2, a signal volume coefficient register $R_{SGV}$, and an adder ADD. The digital signal processing circuit also includes a first signal delayer and power calculator DL1, a second signal delayer and power calculator DL2, a transfer function identification filter $FIL_{ID}$, a first delayed signal memory $X_A[k]$, and a first filter coefficient memory $H_A[k]$. Also included is a second high pass filter HPF2, a fourth signal delayer DL4, a subtracter SUB, a fourth multiplier MUL4, a transmission volume coefficient register $R_{TXV}$, a third signal delayer and power calculator DL3, an equalization filter $FIL_{EQ}$, and a second filter coefficient memory $H_{EQ}[k]$. Also included is a third multiplier MUL3, a correction intensity coefficient register $R_{mu}$, an erroneous correction detection and simultaneous talking detection algorithm $AL_{DBL}$, a coefficient updating algorithm $AL_{UPD}$, a system identification correction intensity calculation algorithm $AL_{mu}$, and a transfer function identification filter learning algorithm $AL_{LN}$.

In the following descriptions, the circuit blocks representing components such as reception volume coefficient register $R_{RXV}$ and first delayed signal memory $X_A[k]$ and the signals constituting the content of these components are represented by the same symbols (for example, $R_{RXV}$ and $X_A[k]$) for the sake of convenience.

The digital reception input signal applied to input terminal $D_{IN}$ is input into first multiplier MUL1 through first high pass filter HPF1, and after it is multiplied by reception volume coefficient $R_{RXV}$, it is input into adder ADD and added to the output of second multiplier MUL2 to form a signal spk. Signal spk is split into two parts; one is input into D/A converter DAC, while the other is input into first signal delayer and power calculator DL1. The first signal delayer and power calculator DL1 calculates the first moving average power value PW1, which is the moving average power of the signal passing through DL1.

The output of D/A converter DAC is input into differential output amplifier $A_{DO}$, where it is amplified to a power level sufficient to drive transducer $Z_T$, and is output to differential output "+" and differential output "−". Differential output "+" is split into two parts, and one signal pathway is connected to differential output "−" from differential output "+" through transducer $Z_T$ via resistor R3.

The other signal pathway is connected to differential output "−" from differential output "+" via resistors R1 and R2. In addition, differential input "+" and the differential input "−", are the two input terminals of differential input amplifier $A_{DI}$, and are connected to the junction point of resistor R3 and transducer $Z_T$ and the junction point of resistor R1 and resistor R2, respectively. The output terminal of differential input amplifier $A_{DI}$ is input into A/D converter ADC.

The output of first signal delayer and power calculator DL1 passes through second signal delayer and power calculator D2 to form signal src and updates first delayed signal memory $X_A[k]$. This is processed by transfer function identification filter $FIL_{ID}$ using first delayed signal memory $X_A[k]$ and first filter coefficient memory $H_A[k]$, and the output becomes signal out. The second signal delayer and power calculator DL2 calculates the second moving average power value PW2, which is the moving average power of the signal passing through DL2.

The output signal of A/D converter ADC is input into fourth signal delayer and power calculator DL4 to form signal ref. Signal out is subtracted from signal ref by subtracter SUB to form signal err, which is input into fourth multiplier MUL4 and multiplied by reception volume coefficient $R_{TXV}$ to form signal mic. Signal mic is input into third signal delayer and power calculator DL3, and third signal delayer and power calculator DL3 calculates the third moving average power value PW3, which is the moving average power of the signal passing through DL3. The output processed by equalization filter $FIL_{EQ}$ using the output of third signal delayer and power calculator DL3 and second filter coefficient memory $H_{EQ}[k]$ is output into digital transmission output signal terminal $D_{OUT}$.

System identification correction intensity calculation algorithm $AL_{mu}$ performs calculations using first moving average power value PW1 and updates signal volume coefficient register $R_{SGV}$ and correction intensity coefficient register $R_{mu}$.

Erroneous correction detection and simultaneous talking detection algorithm $AL_{DBL}$ performs calculations using second moving average power value PW2 and third moving average power value PW3, and it thereby indicates to coefficient updating algorithm $AL_{UPD}$ whether or not the coefficients have been updated and detects the erroneous correction state. Signal err is input into third multiplier MUL3, where it is multiplied by correction intensity coefficient $R_{mu}$, and first filter coefficient memory $H_A[k]$ is updated by coefficient updating algorithm $AL_{UPD}$.

External connections using analog signals are also enabled by replacing digital reception input terminal $D_{IN}$ and digital transmission output terminal $D_{OUT}$, which are used as external connection circuits, with an A/D converter and a D/A converter, respectively.

All of the digital signal processing described above is performed in sync with the sample clock. Accordingly, in digital signal processing, all operations are performed once for each sample clock. Therefore, as long as the method used is one with which all digital signal processing can be completed in one sampling period, this digital signal processing circuit may be configured with one or multiple units of random logic, FPGA, ASIC, DSP, or CPU, and each circuit block of this digital signal processing circuit may be realized by either hardware or software.

An audio digital input signal is input into digital reception signal $D_{IN}$. Low pass noise contained in the direct current component and in the audio input signal are removed from the audio input signal by first high pass filter HPF1, and this is corrected to a signal amplitude level suitable for the signal processing of later stages by the value stored in reception volume coefficient register $R_{RXV}$ and multiplier MUL1.

Meanwhile, signal generator SG generates a sweep signal which sweeps white noise or the entire band through which the signal passes as necessary. This is corrected to a signal amplitude level suitable for the signal processing of later stages by the value stored in signal volume coefficient register $R_{SGV}$ and second multiplier MUL2. These two signals are added using adder ADD to generate signal spk.

Output signal spk of adder ADD is split into two signal pathways, one of which becomes the input data of D/A converter DAC, and after this is digital/analog converted and is amplified to a signal level capable of adequately driving the bridge circuit by differential output amplifier $A_{DO}$, it is output into the bridge circuit. Differential output amplifier $A_{DO}$ is for supplying a large amount of signal power with the bridge circuit when driving at low voltage, and any single output amplifier may be used as long as a sufficient driving voltage can be secured. In this case, it can be used by grounding the differential output "−" side of the differential output amplifier.

Equilibrium Condition of the Bridge Circuit and Suppression of the Output of the Differential Output Amplifier The bridge circuit consists of resistors R1, R2, and R3 and transducer $Z_T$. The condition for minimizing the effects of the output of the differential output amplifier on the positive and negative input signals input from the bridge circuit into differential input amplifier $A_{DI}$ (differential input "+" and differential input "−") is the case in which the following (MATHEMATICAL FORMULA 1) is satisfied. Here, the impedance levels of resistors R1, R2, and R3 and transducer $Z_T$ are represented by those same names.

$$R1:R2=R3:Z_T \quad \text{(MATHEMATICAL FORMULA 1)}$$

Since a device similar to a moving coil or moving core type receiver is used, the impedance of a typical transducer $Z_T$ is not a pure resistance, but is instead the composite impedance of the resistance component and the impedance component, and the composite impedance changes in a non-linear fashion depending on the frequency. Thus, the bridge circuit is not in the complete equilibrium state throughout the entire band through which signals pass.

However, with a typical transducer $Z_T$, the impedance component is miniscule in comparison to the resistance component, so the portion of the input voltage of differential input amplifier $A_{DI}$ resulting from the output of differential output amplifier $A_{DO}$ can be suppressed by approximately 30-50 dB from the output voltage of differential output amplifier $A_{DO}$.

In this embodiment, all three resistors R1-R3 of the bridge are represented as pure resistors, but each of the resistors (resistor R1, in particular) may be a series-parallel circuit comprising a resistor and a capacitor, and a series-parallel circuit comprising a resistor and a capacitor may also be inserted into transducer $Z_T$ in parallel. By fine-tuning the resistance and capacitance to suit the environment and the user, the convergence of the digital circuit operations described later can be more efficiently achieved.

On the other hand, the electromotive force generated as a result of transmission to transducer $Z_T$ is reduced by the parallel resistance of R3 and $Z_T$, but the voltage generated at both ends of transducer $Z_T$ is extracted directly to the differential output of the bridge circuit. Therefore, the substantially damped output voltage of differential output amplifier $A_{DO}$ and the voltage generated at both ends of transducer $Z_T$ are added, and in this form they are input into differential input amplifier $A_{DI}$ and amplified to form an input signal of A/D converter ADC.

Since the voltage generated at both ends of transducer $Z_T$ is extremely weak, the damped output voltage of differential output amplifier $A_{DO}$ sometimes has a larger amplitude at this point.

The ratio of R3 and $Z_T$ affects the energy efficiency of transducer $Z_T$ with respect to the output of differential output amplifier $A_{DO}$. The input energy efficiency when R3 and $Z_T$ are equal is 50%, and the acoustic pressure conversion energy efficiency of the reception signal decreases drastically when R3 is greater than $Z_T$. Conversely, the voltage generated at both ends of transducer $Z_T$ by the transmission voltage pressure signal decreases drastically when R3 is smaller than $Z_T$. Taking these factors into consideration, settings close to R1=R2 and R3=$Z_T$ are considered ideal. Moreover, since thermal noise becomes prominent as the resistance increases, the parallel resistance of R1 and R2 reduces the S/N ratio of the transmission signal. In an actual setup, optimal resistances for R1, R2, and R3 are selected experientially while taking these factors into consideration.

Further, if the individual difference of the transducer $Z_T$ that is used is small, a fixed resistor can also be used for R3. However, if the individual difference of the transducer $Z_T$ that is used is large, it is possible to adjust the bridge balance by using a semi-fixed resistor for R3 or to add an automatic adjusting function which ensures that the third moving average power value PW3, which is obtained by measuring the signal power generated from signal generator SG with third signal delayer and power calculator DL3, is minimized by using an electronically controllable semi-fixed resistor for R3.

On the other hand, signal spk input into first signal delayer and power calculator DL1 from adder ADD is the same as the input signal input into D/A converter DAC, and this is delayed by a signal delay time equivalent to the signal delay time generated by the path consisting of D/A converter DAC (conversion delay), the bridge circuit (group delay), A/D converter ADC (conversion delay) and high pass digital filter HPF2 (group delay) to form signal src. Simultaneously with this delay, first signal delayer and power calculator DL1 calculates the first moving average power value PW1 as a reference signal which will be necessary for system identification learning correction intensity calculation algorithm $AL_{mu}$.

The second signal delayer and power calculator DL2, third signal delayer and power calculator DL3, and fourth signal delayer DL4 have the same delay time. The second moving average power value PW2 calculated by the second signal delayer and power calculator DL2 and the third moving average power value PW3 calculated by third signal delayer and power calculator DL3 are used as operation assessment criteria for erroneous correction detection and simultaneous talking detection algorithm $AL_{DBL}$.

Suppression of the Output Signal of the Differential Output Amplifier Mixed with the Transmission Signal Due to the Transfer Function Identification Filter Transfer function identification filter $FIL_{ID}$ is a filter formed from a digital FIR filter, and it consists of delayed signal memory $X_A[k]$ in which the delay data of signal spk is saved and first filter coefficient memory $H_A[k]$ which holds the tap coefficient of the filter, wherefrom the results of performing convolution integration on two pieces of data are output. The convolution integral is given as the following (MATHEMATICAL FORMULA 2).

$$\sum_{k=0}^{n} X_A[k] \times H_A[k] \quad \text{(MATHEMATICAL FORMULA 2)}$$

Here, n is the number of memory elements+1.

The first filter coefficient $H_A[k]$ of transfer function identification filter $FIL_{ID}$ is a tap coefficient of the FIR filter which identifies the transfer function of the signal pathway from D/A converter DAC to the bridge circuit, A/D converter ADC, and second high pass filter HPF2. Therefore, output out of transfer function identification filter $FIL_{ID}$ is a signal which identifies the bridge driving signal (in other words, the "substantially damped output voltage of differential output amplifier $A_{DO}$" described above) remaining in signal ref which passed through second high pass filter HPF2 and fourth signal delayer DL4 from the A/D converter, so the residual signal, which is unnecessary for transmission, can be suppressed by performing subtraction on this signal using subtracter SUB, which enables the extraction of only signals generated by transmission to transducer $Z_T$.

The transmission signal generated by transducer $Z_T$, which is extracted as a result of subtraction by subtracter SUB, is adjusted to a signal amplitude level suitable for the signal processing of later stages up to digital transmission output signal terminal $D_{OUT}$ by fourth multiplier MUL4 using the value of transmission volume coefficient register $R_{TXV}$ to form signal mic, and this is input into equalization $FIL_{EQ}$ after it is delayed by third signal delayer and power calculator DL3. The transmission signal of transducer $Z_T$ is corrected by the equalization filter such that it has appropriate acoustic frequency characteristics similar to the acoustic vibration generated from the actual sound source, and it is then output to digital transmission output signal terminal $D_{OUT}$.

Figure 2:
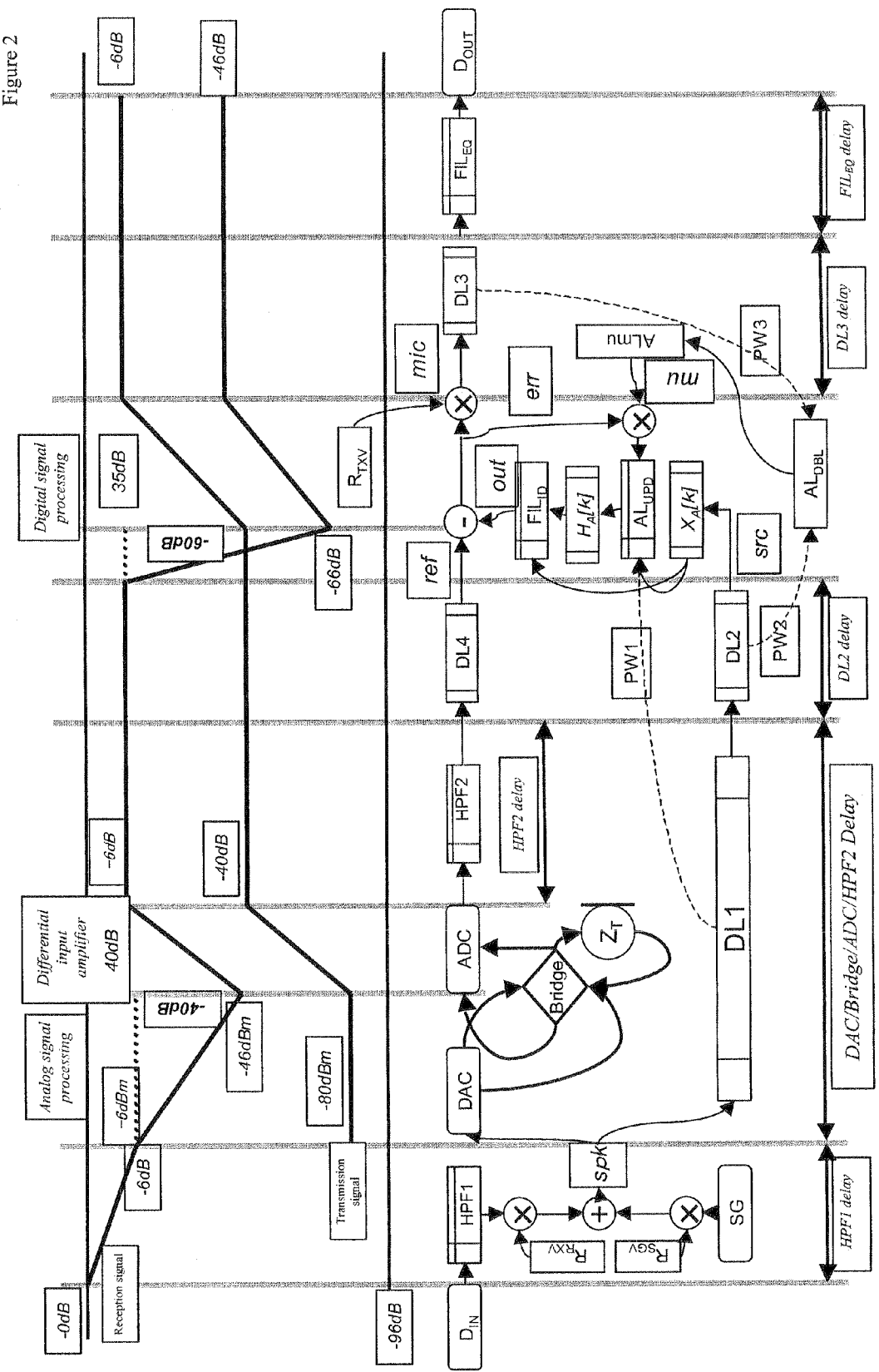
FIG. 2 is a diagram showing the progression of signal processing in an embodiment of the single-transducer full duplex talking circuit of the present invention.

FIG. 2 organizes the progression of the signal processing described above from the perspectives of signal decibel intensity level profiles and delay time profiles. The following description is to clarify the flow of signal processing, and standard conditions in a typical setup are assumed. Therefore, the actual level numbers of each signal differ depending on the setup.

When the digital reception input signal input from input terminal $D_{IN}$ is −0 dB, in other words, when it is input on a full scale, signal spk passing through the first high pass filter and D/A converter DAC forms the output signal of differential output amplifier $A_{DO}$ and drives transducer $Z_T$ via resistor R3. Further, when resistors R1 and R2 are set to the same values while the value of resistor R3 is set to the absolute value (converted to a resistance component) of the average complex impedance within the operating frequency of transducer $Z_T$ and the full scale of the output signal of differential output amplifier $A_{DO}$ is presumed to be 0 dBm, the reception signal applied to transducer $Z_T$ is damped by one-half and becomes −6 dBm. On the other hand, presuming that the transmission signal generated by transducer $Z_T$ is −80 dBm, the ratio of the reception and transmission signals generated at both ends of transducer $Z_T$ becomes 74 dB. In other words, a residual reception signal approximately 5000 times the transmission signal is present at both ends of transducer $Z_T$.

If the bridge circuit were completely balanced, the reception signal would not appear in the differential of the bridge output, but since complete balance cannot be achieved, the residual reception and transmission signals are input as differential signals into both ends of differential input amplifier $A_{DI}$.

Assuming a reception signal suppression ratio of 40 dB in the bridge circuit, the reception signal remains at a level of −46 dBm while the transmission signal generated by transducer $Z_T$ is −80 dBm, so the residual reception signal is still approximately 34 dB larger than the transmission signal.

When the gain of differential input amplifier $A_{DI}$ is presumed to be 40 dB and the full scale of A/D converter ADC is presumed to be 0 dBm, the residual reception signal is −6 dB and the transmission signal is −40 dB. This signal generates signal ref as it passes through second high pass filter HPF2 and fourth signal delayer DL4.

As described above, output spk of adder ADD passes through first signal delayer and power calculator DL1 and second signal delayer and power calculator DL2 to form signal src, and, receiving this signal, transfer function identification filter $FIL_{ID}$ sequentially identifies the transfer characteristics of the signal pathway from D/A converter DAC to second high pass filter HPF2 and generates signal out, which is a signal that is roughly equivalent to the residual reception signal. As a result of the subtraction of signal out from the output of second high pass filter HPF2 by subtracter SUB, the residual reception signal is suppressed by approximately 60 dB, and almost only the transmission signal is output from subtracter SUB.

In this state, the transmission signal is −40 dB while the residual reception signal is −66 dB, and the ratio of the transmission signal and the residual reception signal is approximately −26 dB, so it is essentially possible to retrieve the transmission signal alone. Further, in order to adapt the output of subtracter SUB to the amplitude level of digital transmission signal $D_{OUT}$, it is input into fourth multiplier MUL4, where it is multiplied by transmission volume coefficient RTXv and amplified by approximately 35 dB to form signal RTXmic. Then, after the acoustic characteristics of transducer $Z_T$ are adjusted by the equalization filter, the signal is output to output terminal $D_{OUT}$ of the digital transmission output signal.

In other words, while reception signal suppression is approximately 20-40 dB with typical system identification methods used for echo cancellation, the present invention is able to suppress reception signals obstructing transmission signals by 90 dB or more in a single-transducer full duplex talking circuit by combining the simple analog signal processing and advanced digital signal processing described above.

Coefficient updating algorithm $AL_{UPD}$ is an algorithm which sequentially corrects first filter coefficient $H_A[k]$ of transfer function identification filter $FIL_{ID}$ using delayed signal $X_A[k]$ and the value obtained by multiplying error signal err, which is the output of subtracter SUB, by the correction coefficient mu held by correction intensity coefficient register $R_{mu}$ with third multiplier MUL3. Defining each element of the present delayed signal memory corresponding to input presumed to have constant signal strength and a stochastic process with a steady Gaussian distribution as $X_A[k]$, each element of the present first filter coefficient as $H_A[k]_n$, and each element of the first filter coefficient after updating as $H_A[k]_{n+1}$, a single tap coefficient update is performed using the algorithm of the following MATHEMATICAL FORMULA 3.

$$H_A[k]_{n+1} = H_A[k]_n + X_A[k] \times err \cdot mu \quad \text{(MATHEMATICAL FORMULA 3)}$$

By repeating this calculation, the first filter coefficient $H_A[k]$ converges to the first filter coefficient which identifies the transfer function of the targeted signal pathway. The value of mu is related to the convergence time and the convergence error, and if mu is increased, the convergence time is quickened but the convergence error increases. Further, if $X_A[k]$ does not satisfy a steady stochastic process, $H_A[k]$ may diverge without converging or the convergence time may become long, depending on the value of mu. Moreover, coefficient updating algorithm $AL_{UPD}$ is not limited to this formula, and this can be replaced by various system identification algorithms based on other stochastic processes.

System identification correction intensity calculation algorithm $AL_{mu}$ is an algorithm which calculates the appropriate value for mu held by correction intensity coefficient register $R_{mu}$, which is used by coefficient updating algorithm $AL_{UPD}$. An ordinary digital reception input signal $D_{IN}$ is typically an audio signal which has signal strength that changes with time and has a chromatic spectrum without a steady Gaussian distribution, so it cannot be presumed that its delayed signal $X_A[k]$ will have constant signal strength and a stochastic process with a steady Gaussian distribution.

Therefore, the calculation of first filter coefficient $H_A[k]$ described above is performed with the calculation algorithm shown in the following MATHEMATICAL FORMULA 4 using the first moving average power value PW1 of first signal delayer and power calculator DL1 in order to keep the degree of participation of signal strength constant.

$$mu = \frac{\alpha}{PW_1 + \beta} \quad \text{(MATHEMATICAL FORMULA 4)}$$

Here, $\alpha$ is a constant and $\beta$ is a miniscule value for ensuring that the denominator of the formula is not 0. In the case of a series of signals in which the reference input has a stochastic process with a steady Gaussian distribution and in the case of an audio signal with a chromatic spectrum without a Gaussian distribution, since the convergence time and the convergence error substantially differ depending on the selection of constant $\alpha$, constant $\alpha$ is set to a value based on actual measurements taken when mounted. Further, system identification correction intensity calculation algorithm $AL_{mu}$ is not limited to this formula, and this can be replaced by various algorithms for system identification based on other stochastic processes.

Cases may exist in which the signal power of digital reception input signal $D_{IN}$ is continuously small or in cases in which there is no signal, for example, first filter coefficient $H_A[k]$ cannot be dynamically calculated. Accordingly, system identification correction intensity calculation algorithm $AL_{mu}$ can perform appropriate system identification by increasing the value of signal volume coefficient register $R_{SGV}$ and overlaying a test signal from signal generator SG with the reception signal. Further, system identification correction intensity calculation algorithm $AL_{mu}$ is provided with a function which switches the value of signal volume coefficient register $R_{SGV}$ to the amplitude level for learning when erroneous correction detection and simultaneous talking detection algorithm $AL_{DBL}$, which is described below, detects erroneous correction.

Erroneous correction detection and simultaneous talking detection algorithm $AL_{DBL}$ assesses the level of the transmission signal strength of transducer $Z_T$ (in other words, third moving average power value PW3 calculated by third signal delayer and power calculator DL3) and the level of the digital reception input signal strength (in other words, second moving average power value PW2 calculated by signal delayer and power calculator DL2) added to error signal err used by coefficient updating algorithm $AL_{UPD}$ (in other words, error signal err which is the output of subtracter SUB) and detects the state in which transmission and reception are performed simultaneously (simultaneous talking state). In this case, the algorithm temporarily suspends coefficient updating algorithm $AL_{UPD}$ and ensures that the transmission signal component contained in error signal err does not (erroneously) dynamically update first filter coefficient $H_A[k]$ (erroneous correction prevention).

If error signal err becomes extremely large, exceeding a certain constant value, it is considered to be in the erroneous correction state. Transfer function identification filter learning algorithm $AL_{LN}$ described below is then forcibly activated and first filter coefficient $H_A[k]$ of transfer function identification filter $FIL_{ID}$ is recalculated. Transfer function identification filter learning algorithm $AL_{LN}$ can be forcibly activated externally through learning activation input terminal $I_{LN}$.

Transfer function identification filter learning algorithm $AL_{LN}$ corrects first filter coefficient $H_A[k]$ of transfer function identification filter $FIL_{ID}$ by generating a standard signal approximating a stochastic process with a steady Gaussian distribution using signal generator SG and then reactivating coefficient updating algorithm $AL_{UPD}$. Normal operations are resumed when the prescribed transfer function identification is complete.

Further, the standard signal generated by signal generator SG uses a binary pseudorandom number based on an "M sequence" and uses the two values 1.0 and −1.0. Here, a binary pseudorandom number based on an "M sequence" is a binary pseudorandom number generated by a one-bit number sequence generated by the following linear recurrence formula, MATHEMATICAL FORMULA 5, when $X_n$ is defined as the nth term of the bit sequence.

$$X_n=(X_{n-p}) XOR (X_{n-q})|p>q \quad \text{(MATHEMATICAL FORMULA 5)}$$

In this formula, the value of each term is 0 or 1, and the symbol of operation "XOR" is exclusive OR. In other words, the n-th term is obtained by performing the XOR operation n the (n−p)th term and the (n−q)th term. The state of $X_n$ generates a binary pseudorandom number sequence consisting of a 0 or a 1 for each calculation in Mathematical Formula 5. These two values are used by signal generator SG after they are converted to 1.0 and −1.0.

The standard signal generated by signal generator SG is not limited to this formula, and a standard signal approximating another stochastic process with a steady Gaussian distribution can also be used. For example, the frequency sweep signal provided by the following Mathematical Formula 6 can be used repeatedly. Defining the standard signal sequence as t[i], the signal data for each element can be calculated with the following MATHEMATICAL FORMULA 6.

$$t[i] = \frac{2}{L} \sum_{k=1}^{L/2-1} \cos\left(\frac{2\pi}{K} \cdot k \cdot i + \frac{2\pi}{L} \cdot k^2\right) \bigg|_{0 \leq i < L} \quad \text{(MATHEMATICAL FORMULA 6)}$$

Here, L and k are parameters representing the sweep period and frequency, respectively. This signal generates a test signal which yields a phase proportional to the square of the frequency. Moreover, although a unit impulse is sometimes used as a standard signal, unit impulses have smaller average power levels and require time for system identification in comparison to the two types of standard signals described above, and they sometimes result in system identification with a poor S/N ratio.

Further, signal delayer and power calculators DL1, DL2, DL3, and DL4 or delayed signal memory $X_A[k]$ operate according to the following such algorithm. Presuming that the number of delayed memory elements of signal delayer DL is n+1 and defining each element of delayed memory as DL[k], the input digital signal data as $DL_{IN}$, and the output digital signal data as $DL_{OUT}$, the calculations of the signal delayer are executed using the algorithm of the following Mathematical Formula 7.

$$DL_{OUT}=DL[n]$$

$$DL[k-1]=DL[k]|_{0 \leq k \leq n}$$

$$DL[0]=DL_{IN} \quad \text{(MATHEMATICAL FORMULA 7)}$$

In addition, defining the moving average power value output from the power calculator as PW, the moving average power value PW is calculated by the algorithm of the following MATHEMATICAL FORMULA 8 in each power calculator.

$$PW = \frac{1}{n+1} \sum_{k=0}^{n} (DL[k])^2 \quad \text{(MATHEMATICAL FORMULA 8)}$$

Figure 3:
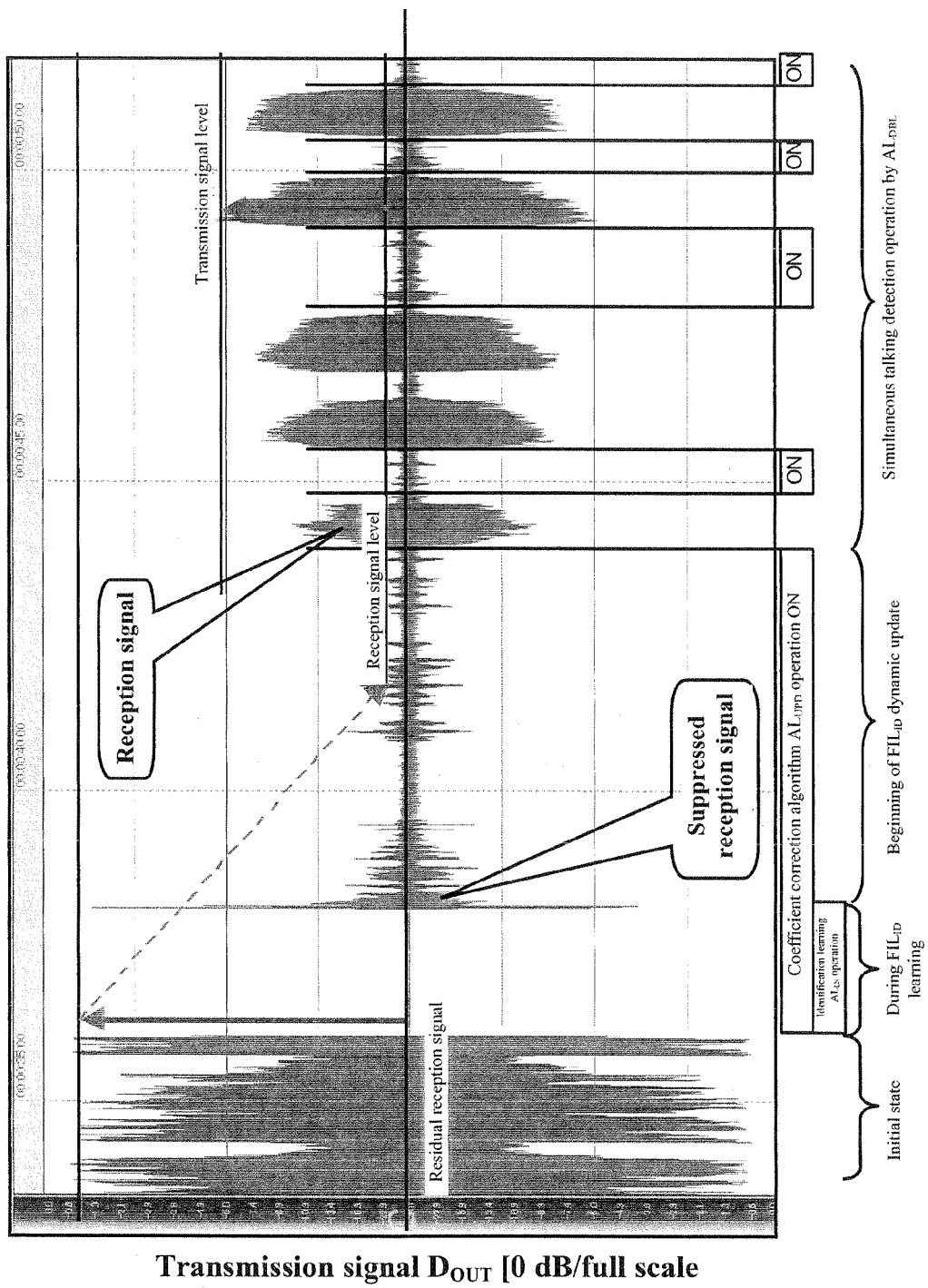
FIG. 3 is a diagram showing the effect of signal processing in an embodiment of the single-transducer full duplex talking circuit of the present invention.

FIG. 3 explains the effect of the signal processing of the single-transducer full duplex talking circuit. The graph of FIG. 3 shows the output amplitude level of digital transmission output signal $D_{OUT}$ on the vertical axis and the time profile on the horizontal axis.

In the initial state, coefficient updating algorithm $AL_{UPD}$ is not operating, so the sum of the residual reception signal and the transmission signal generated at both ends of differential input amplifier $A_{DI}$ is output directly to the output of digital transmission output signal $D_{OUT}$.

When learning activation input terminal $I_{LN}$ is activated, transfer function identification filter learning algorithm $AL_{LN}$ is activated and the learning sequence of $FIL_{ID}$ is begun. Digital transmission output signal $D_{OUT}$ is set to the signal-less state since $R_{TXV}$ is set to 0, but internally the transfer characteristics of the signal pathway from D/A converter DAC to second high pass filter HPF2 are sequentially identified by the test signal from signal generator SG and coefficient updating algorithm $AL_{UPD}$, and first filter coefficient $H_A[k]$ of transfer function identification filter $FIL_{ID}$ is thus converged and corrected. When identification is complete, the test signal from signal generator SG is suspended and $R_{TXV}$ is reverted to the standard setting.

Continuing, the dynamic update of first filter coefficient $H_A[k]$ of transfer function identification filter $FIL_{ID}$ is begun using system identification correction intensity calculation algorithm $AL_{mu}$ and coefficient updating algorithm $AL_{UPD}$.

After dynamically assessing the levels of the third moving average power value PW3 originating from the transmission signal and the second moving average power value PW2 originating from the reception signal, erroneous correction detection and simultaneous talking detection algorithm $AL_{DBL}$ detects the state in which transmission and reception are performed simultaneously (simultaneous talking state) and suspends or resumes coefficient updating algorithm $AL_{UPD}$. Due to this function, the erroneous correction of first filter coefficient $H_A[k]$ of transfer function identification filter $FIL_{ID}$ in the simultaneous talking state is prevented.

As described above, by combining appropriate algorithms, it is possible to suppress reception signals obstructing transmission signals by 90 dB or more within a few seconds after full duplex talking begins in a single-transducer full duplex talking circuit, and it is possible to maintain this state for long periods of time by using erroneous correction detection and simultaneous talking detection algorithm $AL_{DBL}$.

Moreover, the single transducer having a receiving and transmitting function refers to a reversible transducer which has the property that it generates an acoustic pressure signal proportional to a vibration voltage by applying the vibration voltage between both terminals of transducer $Z_T$ and generates a vibration voltage proportional to the vibration acoustic pressure between both terminals of transducer $Z_T$ by applying vibration acoustic pressure to transducer $Z_T$. Using this conversion function, the single transducer is typically used to mutually convert electrical and acoustic signals. Examples of single transducers having this receiving and transmitting function include moving coil type speaker-microphones and moving core type speaker-microphones.

The analog signal processing circuit, digital signal processing circuit, coefficient updating algorithm, system identification learning correction intensity calculation algorithm, erroneous correction detection and simultaneous talking detection algorithm, and identification learning algorithm of the present invention were described above, but the above descriptions were given to facilitate an understanding of the present invention and do not limit the present invention. The present invention can be modified and improved without deviating from its purpose.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A single-transducer full duplex circuit, comprising:
connecting terminals for connecting to an external digital circuit including an input terminal ($D_{IN}$) into which a digital reception input signal is input, an output terminal ($D_{OUT}$) into which a digital transmission output signal is output, and a learning activation input terminal ($I_{LN}$);
an analog signal processing circuit including:
an analog differential output amplifier ($A_{DO}$) which amplifies the output from a D/A converter (DAC);
a bridge circuit consisting of first, second, and third resistors (R1, R2, and R3) and a single transducer ($Z_T$) which are driven by an output of said analog differential output amplifier ($A_{DO}$); and
an analog differential input amplifier ($A_{DI}$) which amplifies an equilibrium signal output by said bridge circuit, wherein an analog output signal of said analog differential input amplifier ($A_{DI}$) is supplied to an A/D converter (ADC);
a digital signal processing circuit including:
a signal generator (SG);
a first high pass filter (HPF1) into which said digital reception input signal is input through said input terminal ($D_{IN}$);
a first multiplier (MUL1) which multiplies an output of said high pass filter (HPF1) by a reception volume coefficient ($R_{RXV}$);
a second multiplier (MUL2) which multiplies an input from said signal generator (SG) by a signal volume coefficient register ($R_{SGV}$);
an adder (ADD) which adds an output of said first multiplier (MUL1) and an output of said second multiplier (MUL2), wherein an output of said adder (ADD) is supplied to said D/A converter (DAC) which converts it into an analog signal;
a first signal delayer and power calculator (DL1) which delays the output of said adder (ADD) and calculates a first moving average power value (PW1);
a second signal delayer and power calculator (DL2) which delays an output of said first signal delayer and power calculator (DL1) and calculates a second moving average power value (PW2);
a delayed signal memory ($X_A[k]$) which sequentially stores an output of said second signal delayer and power calculator (DL2);
a transfer function identification filter ($FIL_{ID}$) into which the output of said delayed signal memory ($X_A[k]$) is input;
a first filter coefficient memory ($H_A[k]$) which stores a filter coefficient corresponding to said transfer function identification filter ($FIL_{ID}$);
a second high pass filter (HPF2) into which an output of said A/D converter (ADC) is input;
a fourth signal delayer (DL4) into which an output of said second high pass filter (HPF2) is input;
a subtracter (SUB) which subtracts an output of said transfer function identification filter ($FIL_{ID}$) from an output of said fourth signal delayer (DL4);
a fourth multiplier (MUL4) which multiplies an output of said subtracter (SUB) by a transmission volume coefficient ($R_{TXV}$);
a third signal delayer and power calculator (DL3) which delays an output of said fourth multiplier (MUL4) and calculates a third moving average power value (PW3);
an equalization filter ($FIL_{EQ}$) into which an output of said third signal delayer and power calculator (DL3) is input; and
a second filter coefficient memory which stores a filter coefficient ($H_{EQ}[k]$) of said equalization filter ($FIL_{EQ}$),
wherein the transmission output terminal ($D_{OUT}$) is driven by the digital transmission output signal output from said equalization filter ($FIL_{EQ}$) and the first filter coefficient ($H_A[k]$) corresponding to said transfer function identification filter $FIL_{ID}$ identifies the transfer function from an input end of said D/A converter (DAC) to a output end of said second high pass filter (HPF2) via said analog signal processing circuit.

2. The single-transducer full duplex circuit according to claim 1 wherein:
said bridge circuit in said analog signal processing circuit is set to an equilibrium condition using the output of said analog differential output amplifier ($A_{DO}$) which drives said transducer ($Z_T$) when said transducer ($Z_T$) is in operation;
said third resistor (R3) being configured with a fixed resistance, variable resistance, or electronically variable resistance in order to satisfy the equilibrium condition; and
the output of the D/A converter (DAC) is divided by resistance from a differential output of said differential output amplifier ($A_{DO}$) and converted from an electrical signal to an acoustic signal by said transducer ($Z_T$).

3. The single-transducer full duplex circuit according to claim 1 wherein:
a first voltage is obtained by dividing the output of said differential output amplifier ($A_{DO}$) with said first resistor (R1) and said second resistor (R2), the first voltage is used as a first input for said differential input amplifier ($A_{DI}$);
a second voltage is obtained by dividing the output of said differential output amplifier with said third resistor (R3) and said transducer ($Z_T$);
a third voltage is obtained by summing the second voltage with a voltage converted to electromotive force from transmission acoustic vibration by said transducer ($Z_T$), the third voltage is used as a second input for said differential input amplifier ($A_{DI}$); and
a differential signal of the voltages on the first and second inputs is amplified by said differential input amplifier ($A_{DI}$).

4. The single-transducer full duplex circuit according to claim 1, characterized in that said digital signal processing circuit has a function in which the first filter coefficient ($H_A[k]$) corresponding to said transfer function identification filter ($FIL_{ID}$) is dynamically corrected in accordance with changes in acoustic impedance when said transducer ($Z_T$) is in operation.

5. The single-transducer full duplex circuit according to claim 1 wherein the second filter coefficient ($H_{EQ}[k]$) corresponding to said equalization filter ($FIL_{EQ}$) stored in said second filter coefficient memory is a tap coefficient which corrects acoustic inconsistencies in electrical signals generated by said transducer ($Z_T$) due to transmission acoustic vibration, the second filter coefficient ($H_{EQ}[k]$) adjusting the digital transmission output signal to have acoustic characteristics similar to the acoustic vibration generated from an actual sound source.

6. The single-transducer full duplex talking circuit according to claim 1 wherein said digital signal processing circuit further comprises;
a correction intensity coefficient register ($R_{mu}$) which holds a correction coefficient (mu);
a third multiplier (MUL3) which multiplies said correction coefficient (mu) by an error signal (err), the error signal being the output of said subtracter (SUB);
wherein a coefficient updating algorithm ($AL_{UPD}$) repeatedly computes the first filter coefficient ($H_A[k]$) corresponding to said transfer function identification filter ($FIL_{ID}$) based on the output of said third multiplier (MUL3), and said coefficient updating algorithm ($AL_{UPD}$) supplies the first filter coefficient ($H_A[k]$) to said transfer function identification filter ($FIL_{ID}$) and updates said first filter coefficient ($H_A[k]$) as a result of convergence of the computations for the first filter coefficient ($H_A[k]$).

7. The single-transducer full duplex circuit according to claim 6 wherein a system identification correction intensity calculation algorithm ($AL_{mu}$) in said digital signal processing circuit dynamically controls the convergence time and convergence error of the repeated computation of said filter coefficient ($H_A[k]$) of said transfer function identification filter ($FIL_{ID}$) according to said first moving average power value (PW1).

8. The single-transducer full duplex circuit according to claim 6 wherein an erroneous correction detection and simultaneous talking detection algorithm ($AL_{DBL}$) in said digital signal processing circuit updates said first filter coefficient ($H_A[k]$) and assesses whether to dynamically update the first filter coefficient ($H_A[k]$) by comparing said second moving average power value (PW2) with said third moving average power value (PW3).

9. The single-transducer full duplex talking circuit according to claim 6 wherein a transfer function identification filter learning algorithm ($AL_{LN}$) in said digital signal processing circuit is forcibly activated when said error signal (err) exceeds a certain value, whereupon $AL_{LN}$ generates a standard signal using the signal generator (SG), updates the coefficient updating algorithm ($AL_{UPD}$), and recalculates the first filter coefficient ($H_A[k]$) corresponding to said transfer function identification filter ($FIL_{ID}$).

10. An audio circuit, comprising:
an analog circuit including a differential output amplifier, a differential input amplifier, and a bridge circuit coupled between the differential output amplifier and the differential input amplifier; and
a digital signal processing circuit configured to generate a first set of filter coefficients ($H_A[k]$) from a first signal input into the analog circuit and generate a second set of filter coefficients from a second signal output from the analog circuit, the digital signal processing circuit generating a transfer function identification filter ($FIL_{ID}$) from the first and second set of filter coefficients and generating an output signal from the transfer function identification filter ($FIL_{ID}$) that is applied to the second signal output from the analog circuit, wherein a transfer function identification filter learning algorithm ($AL_{LN}$) in said digital signal processing circuit is activated in response to an error signal (err) exceeding a certain value, whereupon $AL_{LN}$ initiates generation of a standard signal using a signal generator (SG), updates a coefficient updating algorithm ($AL_{UPD}$), and recalculates the first set filter coefficient ($H_A[k]$) for the transfer function identification filter ($FIL_{ID}$).

11. The audio circuit according to claim 10 further comprising:
an D/A converter DAC coupling the first signal input to the differential output amplifier via a first high pass filter; and
a A/D converter (ADC) coupling the second signal output from the analog circuit to a second high pass filter in the digital signal processing circuit.

12. The audio circuit according to claim 11 wherein the second set of filter coefficients are associated with a transfer function filter for a signal pathway from the DAC, through the analog circuit and ADC, and to the second high pass filter.

13. The audio circuit according to claim 10 wherein the digital signal processing circuit further comprises:
a first signal delayer and power calculator (DL1) configured to delay the first signal input and calculate a first moving average power value (PW1);
a second signal delayer and power calculator (DL2) configured to delay an output of said first signal delayer and power calculator (DL1) and calculate a second moving average power value (PW2);
a delayed signal memory ($X_A[k]$) configured to sequentially store an output of the second signal delayer and power calculator (DL2), wherein the transfer function identification filter ($FIL_{ID}$) is configured to receive an output of the delayed signal memory ($X_A[k]$);
a fourth signal delayer (DL4) configured to receive an output signal from the analog circuit;
a subtracter SUB configured to subtract an output of the transfer function identification filter ($FIL_{ID}$) from an output of said fourth signal delayer (DL4);
a fourth multiplier (MUL4) configured to multiply an output of the subtracter (SUB) by a transmission volume coefficient ($R_{TXV}$);
a third signal delayer and power calculator (DL3) configured to delay an output of the fourth multiplier (MUL4) and calculate a third moving average power value (PW3);
an equalization filter ($FIL_{EQ}$) configured to receive an output of the third signal delayer and power calculator (DL3).

14. An apparatus, comprising:
an analog signal processing circuit comprising a transducer ($Z_T$); and
a digital signal processing circuit comprising:
a first input configured to receive a reception signal;
a first output configured to output a transmission signal;
a second output coupled to an input of the analog signal processing circuit;
a second input coupled to an output of the analog signal processing circuit;
a transfer function identification filter ($FIL_{ID}$) configured to identify a transfer function of the analog signal processing circuit, wherein the digital signal processing circuit is further configured to dynamically correct filter coefficients ($H_A[k]$) for the transfer function identification filter ($FIL_{ID}$) according to changes in acoustic impedance of the transducer ($Z_T$);

a system identification correction intensity calculation algorithm ($AL_{mu}$) configured to dynamically control a convergence time and a convergence error of the filter coefficients ($H_A[k]$) for the transfer function identification filter ($FIL_{ID}$) according to a first moving average power value (PW1) of the reception signal, and an erroneous correction detection and simultaneous talking detection algorithm ($AL_{DBL}$) configured to update the filter coefficients ($H_A[k]$) and assess whether to dynamically update the filter coefficients ($H_A[k]$) by comparing a second moving average power value (PW2) of the reception signal with a third moving average power value (PW3) of the transmission signal.

15. The apparatus according to claim 14 wherein the digital signal processing circuit further comprises a transfer function identification filter learning algorithm ($AL_{LN}$) configured to forcibly activate when an error signal (err) exceeds a certain value and generate a standard signal using a signal generator (SG), update a coefficient updating algorithm ($AL_{UPD}$), and recalculate the filter coefficients ($H_A[k]$) corresponding to the transfer function identification filter ($FIL_{ID}$).

16. The apparatus according to claim 14 wherein the digital signal processing circuit is configured to dynamically control a convergence time and convergence error of the filter coefficient ($H_A[k]$) according to the first moving average power value (PW1) of the reception signal.

17. The apparatus according to claim 16 wherein the digital signal processing circuit is further configured to dynamically control the convergence time and convergence error of the filter coefficient ($H_A[k]$) by varying an amplitude level of a control signal and combining the control signal with the reception signal.

18. The apparatus according to claim 14 wherein the digital signal processing is further configured to assess whether to dynamically update the filter coefficient ($H_A[k]$) according to a signal strength of the reception signal and a signal strength of the transmission signal.

19. The apparatus according to claim 18 wherein the digital signal processing is further configured to stop updating the filter coefficient ($H_A[k]$) when the signal strength of the transmission signal and the reception signal indicate a simultaneous talking state.

20. The apparatus according to claim 14 wherein the analog signal processing circuit comprises:
an analog differential output amplifier ($A_{DO}$) coupled through a D/A converter (DAC) to the second output of the digital signal processing circuit;
an analog differential input amplifier ($A_{DI}$) coupled through an A/D converter (ADC) to the second input of the digital signal processing circuit; and
a bridge circuit consisting of first, second, and third resistors (R1, R2, and R3) and the transducer ($Z_T$), the bridge circuit coupled between the analog differential output amplifier ($A_{DO}$) and the analog differential input amplifier ($A_{DI}$).

* * * * *